United States Patent
Konaka et al.

(10) Patent No.: US 6,939,822 B2
(45) Date of Patent: Sep. 6, 2005

(54) DIELECTRIC CERAMIC, METHODS FOR MAKING AND EVALUATING THE SAME, AND MONOLITHIC CERAMIC ELECTRONIC COMPONENT

(75) Inventors: Hiroyasu Konaka, Kusatsu (JP);
Tomoyuki Nakamura, Shiga-ken (JP);
Toshihiro Okamatsu, Moriyama (JP);
Harunobu Sano, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 411 days.

(21) Appl. No.: 10/352,038

(22) Filed: Jan. 28, 2003

(65) Prior Publication Data

US 2003/0147198 A1 Aug. 7, 2003

Related U.S. Application Data

(62) Division of application No. 10/092,258, filed on Mar. 7, 2002, now Pat. No. 6,556,423.

(30) Foreign Application Priority Data

Mar. 19, 2001 (JP) ........................................ 2001-077576

(51) Int. Cl.⁷ ........................ C04B 35/468; C04B 35/49
(52) U.S. Cl. ........................ 501/137; 501/138; 501/139; 423/598
(58) Field of Search ................................ 501/137, 138, 501/139; 423/598

(56) References Cited

U.S. PATENT DOCUMENTS

| | | | | |
|---|---|---|---|---|
| 4,870,539 A | * | 9/1989 | Chance et al. ........... | 361/321.5 |
| 5,011,804 A | * | 4/1991 | Bergna et al. ........... | 501/138 |
| 5,672,378 A | * | 9/1997 | Maher et al. ........... | 264/615 |
| 5,757,610 A | * | 5/1998 | Wada et al. ........... | 361/311 |
| 6,329,311 B1 | * | 12/2001 | Fujii et al. ........... | 501/136 |
| 6,437,969 B2 | * | 8/2002 | Mizuno et al. ........... | 361/311 |
| 6,479,419 B2 | * | 11/2002 | Masuda ........... | 501/138 |

FOREIGN PATENT DOCUMENTS

| | | | |
|---|---|---|---|
| JP | 05-009066 | * | 1/1993 |
| JP | 05-009067 | * | 1/1993 |
| JP | 05-009068 | * | 1/1993 |
| JP | 06-005460 | * | 1/1994 |
| JP | 09-270366 | * | 10/1997 |
| JP | 11-157928 | * | 6/1999 |
| JP | 2001-057314 | * | 2/2001 |

* cited by examiner

Primary Examiner—Karl Group
(74) Attorney, Agent, or Firm—Dickstein, Shapiro, Morin & Oshinsky, LLP.

(57) ABSTRACT

A dielectric ceramic has a ceramic structure of crystal grains and grain boundaries between the crystal grains. The crystal grains are of a main component represented by the formula $ABO_3$ and an additive containing a rare earth element wherein A is at least one of barium, calcium, and strontium, barium being an essential element, and B is at least one of titanium, zirconium, and hafnium, titanium being an essential element. The average rare earth element concentration in the interior of the crystal grains is about 50% or less the average rare earth element concentration at the grain boundaries. Furthermore, about 20% to 70% of the crystal grains have a rare earth element concentration in the center of the crystal grain of at least about $\frac{1}{50}$ the maximum rare earth element concentration in a region extending inward from the surface by a distance corresponding to about 5% of the diameter of the crystal grain.

14 Claims, 2 Drawing Sheets

DIELECTRIC CERAMIC, METHODS FOR MAKING AND EVALUATING THE SAME, AND MONOLITHIC CERAMIC ELECTRONIC COMPONENT

This is a divisional of U.S. patent application Ser. No. 10/092,258, filed Mar. 7, 2002 now U.S. Pat. No. 6,556,423.

BACKGROUND OF THE INVENTION

1. Field of the Invention

The present invention relates to dielectric ceramics, methods for making and evaluating the same, and monolithic ceramic electronic components. In particular, the present invention relates to thin monolithic ceramic electronic components such as thin monolithic ceramic capacitors.

2. Description of the Related Art

Monolithic ceramic capacitors, as an example of monolithic ceramic electronic components relating to the present invention, are typically produced as follows.

Green ceramic sheets, each composed of a dielectric ceramic material and provided with an internal electrode pattern of a conductive material, are prepared. The dielectric ceramic material may comprise $BaTiO_3$, for example.

A plurality of green ceramic sheets, including the above sheets provided with the internal electrode patterns, is stacked and is thermally compressed to form a green composite.

The green composite is fired to prepare a sintered composite, which has internal electrodes formed of the above-described conductive material.

External electrodes are formed on outer faces of the composite so that the external electrodes are electrically connected to predetermined internal electrodes. The external electrodes are formed, for example, by applying a conductive paste containing a conductive metal powder and a glass frit on the outer faces of the composite and baking the composite. A monolithic capacitor is thereby formed.

In order to reduce production costs of the monolithic ceramic capacitors, relatively inexpensive base metals such as nickel and copper are often used nowadays as the conductive materials for the internal electrodes. Unfortunately, the green composite must be fired in a neutral or reducing atmosphere to prevent oxidation of the base metal in the production of monolithic ceramic capacitors having such internal electrodes formed of base metals. As a result, the dielectric ceramic used in the monolithic ceramic capacitor must have resistance to reducing atmosphere.

$BaTiO_3$-rare earth oxide-$Co_2O_3$ compositions for such dielectric ceramics having resistance to reducing atmosphere are disclosed in Japanese Unexamined Patent Application Publication Nos. 5-9066, 5-9067, and 5-9068. Dielectric ceramics having a high dielectric constant, a small change in dielectric constant with temperature and a long life at high-temperature load are disclosed in Japanese Unexamined Patent Application Publication Nos. 6-5460 and 9-270366.

Trends toward miniaturization and higher capacitance are noticeable in monolithic ceramic capacitors with the rapid miniaturization of electronic components as a result of recent great advances in electronics technologies.

The requirements regarding reliability for dielectric ceramics which are fired in an atmosphere which does not oxidize base metals used in internal electrodes are a high dielectric constant, a small change in dielectric constant with temperature and time, and high electrical insulation for thinner dielectric ceramic layers. The above-described known dielectric ceramics, however, do not completely satisfy these requirements.

For example, the dielectric ceramics disclosed in Japanese Unexamined Patent Application Publication Nos. 5-9066, 5-9067, and 5-9068 above satisfy the X7R characteristics in the EIA Standard and exhibit high electrical insulation, but do not always satisfy the demands of the market, namely, they may be sufficiently reliable, when the thicknesses of the dielectric ceramics are reduced to about 5 $\mu$m or less and particularly 3 $\mu$m or less.

In the dielectric ceramic disclosed in Japanese Unexamined Patent Application Publication No. 6-5460, the particle size of the $BaTiO_3$ powder used is large. Thus, its reliability decreases and the change in electrostatic capacitance with time increases as the thickness of the dielectric ceramic layer decreases.

Also, the reliability of the dielectric ceramic disclosed in Japanese Unexamined Patent Application Publication No. 9-270366 decreases and the change in electrostatic capacitance with time increases while applying a DC voltage as the thickness of the dielectric ceramic layer decreases.

When the same rated voltage is applied to a dielectric ceramic layer having a reduced thickness, which agrees with miniaturization and higher capacitance requirements of the monolithic ceramic capacitor, a larger electric field is applied to each layer of the dielectric ceramic. Thus, the insulating resistance at room or high temperature decreases, resulting in significantly decreased reliability. Accordingly, the rated voltage must be reduced when the thickness of the dielectric ceramic layers in the known dielectric ceramic is reduced.

There have been demands that monolithic ceramic capacitors have high insulation resistance in high electric fields and have high reliability, and that they can be used at high rated voltages even when the thicknesses of the dielectric ceramic layers are reduced.

It is known that the electrostatic capacitance of a monolithic ceramic capacitor varies over time because a DC voltage is applied in use. As the thickness of the dielectric ceramic layers decreases, the DC electric field per dielectric ceramic layer increases. As a result, the electrostatic capacitance changes more significantly over time.

Thus, there have been demands that monolithic ceramic capacitors have a small change in electrostatic capacitance when a DC voltage is applied in use.

Also, monolithic ceramic electronic components other than the monolithic ceramic capacitors have the above-described problems and demands.

SUMMARY OF THE INVENTION

Accordingly, an object of the present invention is to provide a dielectric ceramic exhibiting a high dielectric constant, small changes in dielectric constant with temperature and over time when a DC voltage is applied in use, a high product of insulation resistance and electrostatic capacitance (CR product), and a prolonged lifetime, in terms of insulation resistance, under accelerated testing at high temperature and high voltage.

Another object of the present invention is to provide a method for making the dielectric ceramic.

Another object of the present invention is to provide a method for evaluating the dielectric ceramic in which dielectric ceramics having the above superior characteristics can be readily and efficiently selected, for example, in a designing process.

Another object of the present invention is to provide a monolithic electric component comprising the above dielectric ceramic.

The present invention is directed to a dielectric ceramic having a ceramic structure comprising crystal grains and grain boundaries between the crystal grains, the crystal grains comprising a main component represented by the formula $ABO_3$ and an additive containing a rare earth element wherein A is at least one of barium, calcium and strontium, barium being an essential element, and B is at least one of titanium, zirconium and hafnium, titanium being an essential element.

This dielectric ceramic further satisfies the following conditions: (1) the average rare earth element concentration in the interior of the crystal grains is about 0.5 or less the average rare earth element concentration at the grain boundaries, and (2) about 20% to 70% of the crystal grains have a rare earth element concentration in the center of the crystal grain of at least about 1/50 the maximum rare earth element concentration in a region extending inward from the surface by a distance corresponding to about 5% of the diameter of the crystal grain.

This dielectric ceramic exhibits a high dielectric constant, small changes in dielectric constant with temperature and over time when a DC voltage is applied in use, a high product of insulation resistance and electrostatic capacitance (CR product), and a prolonged lifetime, in terms of insulation resistance, under accelerated testing at high temperature and high voltage.

A thin monolithic ceramic electronic component including dielectric ceramic layers composed of this dielectric ceramic is highly reliable for a long time.

The present invention is also directed to a method for making such a dielectric ceramic. The method for making the dielectric ceramic comprises the steps of mixing fractions of AO, $BO_2$ and the rare earth element, calcining the mixture in air, and pulverizing the mixture to prepare a modified $ABO_3$ powder in which the rare earth element is present in the interiors of the particles; mixing the remaining fractions of the AO and $BO_2$, calcining the mixture in air, and pulverizing the mixture to prepare an $ABO_3$ powder in which the rare earth element is not present in the interiors of the particles; and mixing the modified $ABO_3$ powder, the $ABO_3$ powder and the remaining fraction of the rare earth element, and firing the mixture.

Since the $ABO_3$ powder, the modified $ABO_3$ powder and the rare earth element are mixed at two stages, the above-described concentration profile of the rare earth element is readily achieved in the crystal grains. In conventional one-shot mixing, such a concentration profile is barely achieved.

Furthermore, the present invention is directed to a method for evaluating a dielectric ceramic that has a ceramic structure comprising crystal grains and grain boundaries between the crystal grains, the crystal grains comprising a main component represented by the formula $ABO_3$ and an additive containing a rare earth element wherein A is at least one of barium, calcium and strontium, barium being an essential element, and B is at least one of titanium, zirconium and hafnium, titanium being an essential element.

This method comprises the steps of measuring the average rare earth element concentration in the interiors of the crystal grains and the average rare earth element concentration at the grain boundaries; determining whether or not a first condition that the average rare earth element concentration in the interior of the crystal grains is about ½ or less the average rare earth element concentration at the grain boundaries is satisfied; measuring the rare earth element concentration in the center of each crystal grain and the maximum rare earth element concentration in a region extending inward from the surface by a distance corresponding to about 5% of the diameter of the crystal grain; determining whether or not a second condition that about 20% to 70% of the crystal grains each have a rare earth element concentration in the center of the crystal grain which is at least about 1/50 of the maximum rare earth element concentration in the region is satisfied; and assuming the dielectric ceramic to be nondefective when the dielectric ceramic satisfies the first and second conditions.

This method condenses a cycle of designing, making and evaluation of a dielectric ceramic.

The present invention is also directed to a monolithic ceramic electronic component comprising a composite comprising a plurality of stacked dielectric ceramic layers; and internal electrodes formed along predetermined interfaces between the dielectric ceramic layers, the dielectric ceramic layers comprising the above-described dielectric ceramic.

Preferably, the internal electrodes comprise a base metal.

Since the dielectric ceramic according to the present invention exhibits high resistance to reducing environments, the base metal can be used as a conductive component of the internal electrodes.

The monolithic ceramic electronic component is preferably a monolithic ceramic capacitor. In such a case, the monolithic ceramic electronic component further comprises a first external electrode and a second external electrode formed on outer faces of the composite, wherein the internal electrodes are arranged in the stacking direction of the composite and are alternately and electrically connected to the first external electrode and the second external electrode to define the monolithic ceramic capacitor.

This monolithic ceramic capacitor has a large capacitance regardless of its compactness and can be used at conventional rated voltages. Thus, the thickness of the dielectric ceramic layers in the monolithic ceramic capacitor can be reduced to, for example, about 1 $\mu$m without problems.

DESCRIPTION OF THE PREFERRED EMBODIMENT

Figure 1:
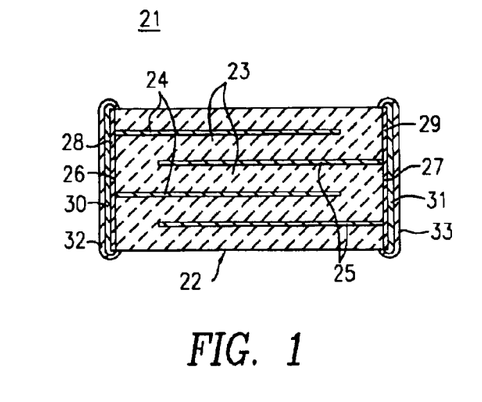
FIG. 1 is a schematic cross-sectional view of a monolithic ceramic capacitor according to an embodiment of the present invention.

FIG. 1 is a schematic cross-sectional view of a monolithic ceramic capacitor 21 according to an embodiment of the present invention.

The monolithic ceramic capacitor 21 includes a composite 22. The composite 22 includes a plurality of dielectric ceramic layers 23 and a plurality of internal electrodes 24 and 25. Each of the internal electrodes 24 and 25 extends along a predetermined one among the interfaces between the dielectric ceramic layers 23 and toward outer faces of the composite 22. The internal electrodes 24 extending to an outer face 26 (first outer face) and the internal electrodes 25 extending to the opposing outer face 27 (second outer face) are arranged alternately.

External electrodes 28 and 29 are formed on the first outer face 26 and the second outer face 27, respectively. First plating layers 30 and 31 formed of nickel, copper or the like, are formed on the external electrodes 28 and 29, respectively. Furthermore, second plating layers 32 and 33 of solder, tin or the like, are formed on the first plating layers 30 and 31, respectively.

Since the internal electrodes 24 and 25 are stacked in the monolithic ceramic capacitor 21, each pair of adjacent internal electrodes 24 and 25 constitute an electrostatic capacitor. The internal electrodes 24 are electrically connected with the external electrode 28 and the internal electrodes 25 are electrically connected with the external electrode 29. Thus, the electrostatic capacitance between the internal electrodes 24 and 25 is discharged through the external electrodes 28 and 29.

In this monolithic ceramic capacitor 21, the dielectric ceramic layer 23 has a ceramic structure that comprises crystal grains and grain boundaries between the crystal grains. The crystal grains comprise the main component represented by the formula $ABO_3$ and an additive containing a rare earth element where A is at least one of barium, calcium and strontium, barium being an essential element, and B is at least one of titanium, zirconium and hafnium, titanium being an essential element.

This dielectric ceramic satisfies the following conditions: (1) the average rare earth element concentration in the interior of the crystal grains is about ½ or less the average rare earth element concentration at the grain boundaries (first condition); and (2) about 20% to 70% of numbers of the crystal grains have a rare earth element concentration in the center of the crystal grain of at least about 1/50 the maximum rare earth element concentration in a region extending inward from the surface by a distance corresponding to about 5% of the diameter of the crystal grain (second condition).

The second condition is determined for the following reasons: If the proportion of the crystal grains satisfying the concentration profile of the second condition is less than about 20%, the lifetime in terms of insulation resistance shortens under accelerated testing at high temperature and high voltage, resulting in low reliability of thin dielectric ceramic layers 23. If the proportion of the crystal grains exceeds about 70%, the change in the dielectric constant with temperature at high temperature increases due to the shifter effect of the rare earth element.

The proportion of the crystal grains adequately containing the rare earth element in the centers thereof is preferably at least about 30% in view of prolonged high-temperature load lifetime.

The first condition is determined based on the following fact: If the average rare earth element concentration in the interiors of the crystal grains exceeds about ½ the average rare earth element concentration at the grain boundaries, the change in electrostatic capacitance over time is large when a DC voltage is applied.

In the present invention, the term "crystal grain boundary" represents both a region formed between two crystal grains primarily containing $ABO_3$ and a region formed at the boundary between three crystal grains (so-called "triplet point"). Specifically, the grain boundary indicates a definite layer that is crystallographically observed between crystal grains in a cross-section of the dielectric ceramic. If a definite layer is not observed between the crystal grains, the grain boundary includes the connection point and/or connection line and a region extending therefrom to a distance of 2 nm.

Such a grain boundary may further contain M, silicon, any one of A and B, magnesium, vanadium, boron and aluminum, where M is at least one selected from the group consisting of nickel, cobalt, iron, chromium and manganese, A is at least one selected from the group consisting of barium, calcium and strontium, and B is at least one selected from the group consisting of titanium, zirconium and hafnium. These elements do not substantially have adverse effects on the properties of the dielectric ceramic.

The overall rare earth element concentration in the dielectric ceramic is not limited in the present invention. The overall rare earth element concentration to 100 moles of the main component $ABO_3$ is preferably about 0.2 mole or more in order to achieve a prolonged high-temperature load lifetime and is about 5 moles or less to achieve a high dielectric constant.

The rare earth element is at least one selected from the group consisting of lanthanum, cerium, promethium, neodymium, samarium, europium, gadolinium, terbium, dysprosium, holmium, erbium, thulium, ytterbium, lutetium and yttrium. Desired characteristics are achieved by using one type of rare earth element; however, a combination of at least two rare earth elements facilitates the control of properties which satisfy the demands of the market: a high dielectric constant; a high insulation resistance, and a prolonged high-temperature load lifetime.

The average particle size of the $ABO_3$ powder as the primary component in the dielectric ceramic is not limited in the present invention. The average particle size is preferably in the range of about 0.05 to 0.7 $\mu$m to facilitate a reduction in thickness of the dielectric ceramic layer 23. When the $ABO_3$ has such an average particle size, the thickness of dielectric ceramic layer 23 can be reduced to about 1 $\mu$m without problems.

A method for making the monolithic ceramic capacitor 21 will now be described.

A base powder for the dielectric ceramic constituting the dielectric ceramic layer 23 is prepared as follows.

A fraction of AO, a fraction of $BO_2$ and a fraction of a rare earth element are mixed according to a predetermined formula where A is at least one element selected from the group consisting of barium, calcium and strontium, barium being an essential element, B is at least one element of titanium, zirconium and hafnium, titanium being an essential element, and the rare earth element is at least one selected from the group consisting of lanthanum, cerium, promethium, neodymium, samarium, europium, gadolinium, terbium, dysprosium, holmium, erbium, thulium, ytterbium, lutetium and yttrium. The mixture is calcined in air and pulverized. A modified $ABO_3$ powder in which the rare earth element is present inside the crystal grain is thereby prepared.

The remaining fractions of AO and $BO_2$ are mixed and the mixture is calcined in air and pulverized to prepare an $ABO_3$ powder containing no rare earth elements in the interior thereof.

Amounts of the modified $ABO_3$ powder and unmodified $ABO_3$ powder are selected to achieve a desired result and are mixed with the remaining fraction of the rare earth element. Furthermore, $SiO_2$, $MgO$, $MnO_2$ and $B_2O_3$ may be added to the mixture, if necessary. The mixture is used as a base powder for the dielectric ceramic.

A sintered dielectric ceramic layer 23 is readily prepared by sintering a green compact containing this base powder, in which the crystal grains have the above-described rare earth element concentration profile in the interiors of crystal grains and at the grain boundaries.

When all the AO powder, the BO$_2$ powder, the rare earth element and MO and Si as optional components, where M is at least one of nickel, cobalt and manganese, are mixed and allowed to react with each other at once, or when an ABO$_3$ powder, the rare earth element, and MO and SiO$_2$ as optional components are mixed and allowed to react with each other at once, the crystal grains in the resulting dielectric ceramic barely have the above-described rare earth element concentration profile in the interiors of crystal grains and at the grain boundaries.

To the base powder, an organic binder and a solvent are added to prepare a slurry. Using this slurry, green ceramic sheets for the dielectric ceramic layers 23 are prepared.

A conductive paste film for forming the internal electrode 24 or 25 is formed on each green ceramic sheet by, for example, screen-printing. The conductive paste contains a base metal, for example, elemental nickel, a nickel alloy, elemental copper or a copper alloy, as a conductive component. The internal electrodes 24 and 25 may be formed by evaporation or plating instead of printing.

A plurality of green ceramic sheets provided with the conductive paste films are stacked and the composite is sandwiched by two green ceramic sheets having no conductive paste films. The composite is compressed and cut, if necessary to prepare a green composite for the composite 22. The conductive paste films are exposed at the respective sides of the green composite.

The green composite is fired in a reducing atmosphere to prepare the sintered composite 22 shown in FIG. 1 in which the green ceramic sheets constitute the dielectric ceramic layers 23 and the conductive paste films constitute the internal electrodes 24 and 25.

The external electrodes 28 and 29, respectively, are formed on the first and second outer faces 26 and 27 of the composite 22 and are thereby connected to the internal electrodes 24 and 25.

The external electrodes 28 and 29 may be formed of the same material as that of the internal electrodes 24 and 25. The external electrodes 28 and 29 may also be formed of a powder of elemental silver, elemental palladium or a silver-palladium alloy. The metal powder may contain a glass frit of B$_2$O$_3$—SiO$_2$—BaO glass, LiO$_2$—SiO$_2$—BaO glass, B$_2$O$_3$—LiO$_2$—SiO$_2$—BaO glass, or the like. These materials may be selected in view of the application and the environment in the use of the monolithic ceramic capacitor 21.

The external electrodes 28 and 29 are generally formed by applying a paste containing the above conductive metal powder on the surfaces of the sintered composite 22 and baking the paste. Alternatively, the paste may be applied to a green composite. In this case, sintering of the green composite and baking of the paste can be simultaneously achieved in one firing process.

The external electrodes 28 and 29 are plated with nickel, copper or the like, to form first plating layers 30 and 31, respectively. The first plating layers 30 and 31 are plated with solder, tin or the like, to form second plating layers 32 and 33, respectively. The first plating layers 30 and 31 may be omitted according to the application.

The fabrication of the monolithic ceramic capacitor 21 is thereby completed.

In any of the steps of preparing the base powder for the dielectric ceramic and the step of fabricating the monolithic ceramic capacitor 21, the monolithic ceramic capacitor 21 may incorporate impurities such as aluminum, zirconium, iron, hafnium, sodium and nitrogen. Fortunately, these impurities do not cause deterioration of electrical characteristics of the monolithic ceramic capacitor 21.

Also in any of the steps for preparing the monolithic ceramic capacitor 21, the internal electrodes 24 and 25 may incorporate impurities such as iron. These impurities also do not cause deterioration of electrical characteristics of the monolithic ceramic capacitor 21.

As described above, the dielectric ceramic constituting the dielectric ceramic layers 23 in the resulting monolithic ceramic capacitor 21 satisfies the following conditions: (1) The average rare earth element concentration in the interior of the crystal grains is about ½ or less the average rare earth element concentration at the grain boundaries (first condition); and (2) about 20% to 70% by number of the crystal grains have a rare earth element concentration in the center of the crystal grain of at least about 1/50 the maximum rare earth element concentration in a region extending inward from the surface by a distance corresponding to about 5% of the diameter of the crystal grain (second condition). Thus, the dielectric ceramic has a high dielectric constant, small change in dielectric constant with temperature and time when a DC voltage is applied, a high product of the insulation resistance and the electrostatic capacitance (CR product), and a prolonged lifetime, in terms of insulation resistance, under accelerated testing at high temperature and high voltage. Accordingly, the monolithic ceramic capacitor 21 is highly reliable even the thickness of the dielectric ceramic layer 23 is reduced.

As described above, the rare earth element concentration profile in the dielectric ceramic significantly affects the electrical characteristics of the dielectric ceramic. Thus, a method for evaluating the dielectric ceramic can be provided based on the rare earth element concentration profile. This method condenses a cycle of designing, making and evaluation of a dielectric ceramic.

That is, the dielectric ceramic is evaluated based on the following steps.

The average rare earth element concentration in the interiors and the average rare earth element concentration at the grain boundaries of the crystal grains are measured to determine whether or not the first condition that the average rare earth element concentration in the interiors is about ½ or less the average rare earth element concentration at the grain boundaries is satisfied.

Also, the rare earth element concentration in the center of the crystal grain and the maximum rare earth element concentration in a region extending inward from the surface by a distance corresponding to about 5% of the diameter of the crystal grain are measured for all the crystal grains to determine whether or not the second condition that about 20% to 70% of the crystal grains have a rare earth element concentration in the center of the crystal grain of at least about 1/50 the maximum rare earth element concentration in a region extending inward from the surface by a distance corresponding to about 5% of the diameter of the crystal grain is satisfied.

If the dielectric ceramic satisfies both the first and second conditions, this is assumed to be satisfactory.

EXAMPLES

1. Preparation of Base Powders for Dielectric Ceramics

Example 1

BaTiO$_3$ was used as ABO$_3$, (Ba$_{0.99}$Dy$_{0.01}$)TiO$_3$ was used as modified ABO$_3$, and Dy$_2$O$_3$—NiO—MnO$_2$—SiO$_2$ was used as an additive.

Barium carbonate ($BaCO_3$) and titanium dioxide ($TiO_2$) were weighed in a molar ratio of Ba:Ti=1:1. These compounds were mixed together with deionized water in a ball mill for 24 hours, and the water was evaporated to prepare a powder mixture. The powder mixture was calcined at 1,000° C. in air and was pulverized to form $BaTiO_3$ powder.

Barium carbonate ($BaCO_3$), titanium dioxide ($TiO_2$), and dysprosium oxide ($Dy_2O_3$) were weighed in a molar ratio of Ba:Dy:Ti=0.09:0.01:1, and these compounds were mixed together with deionized water in a ball mill for 24 hours. Water was evaporated to prepare a powder mixture. The powder mixture was calcined at 1,000° C. in air, and was pulverized to form $(Ba_{0.99}Dy_{0.01})TiO_3$ powder.

The $BaTiO_3$ powder and the $(Ba_{0.99}Dy_{0.01})TiO_3$ powder were compounded in a molar ratio of 50:50. With respect to a total of 100 moles of this mixture, 0.75 mole of powdered $Dy_2O_3$, 0.5 mole of powdered NiO, 0.2 mole of powdered $MnO_2$ and 1.5 moles of powdered $SiO_2$ were added to prepare a base powder mixture for dielectric ceramics.

Comparative Example 1

Powders of $BaCO_3$, $TiO_2$, $Dy_2O_3$, NiO, $MnO_2$ and $SiO_2$ were compounded in a molar ratio of 99.5:100:1.0:9.5:0.2:1.5 at the same time. The mixture was calcined at 1,000° C. and was pulverized to prepare a base powder mixture for dielectric ceramics. The mixture had the same composition as that in EXAMPLE 1.

Example 2

$(Ba_{0.95}Sr_{0.05})TiO_3$ powder was used as $ABO_3$, $(Ba_{0.93}Sr_{0.05}Gd_{0.02})TiO_3$ powder was used as modified $ABO_3$, and $Ho_2O_3$—$Cr_2O_3$—MgO—$SiO_2$ powder was used as an additive. The $(Ba_{0.95}Sr_{0.05})TiO_3$ powder and the $(Ba_{0.93}Sr_{0.05}Gd_{0.02})TiO_3$ powder were prepared as in EXAMPLE 1.

The $(Ba_{0.95}Sr_{0.05})TiO_3$ powder and the $(Ba_{0.93}Sr_{0.05}Gd_{0.02})TiO_3$ powder were compounded in a molar ratio of 70:30. With respect to a total of 100 moles of this mixture, 0.8 mole of powdered $Ho_2O_3$, 0.5 mole of powdered $Cr_2O_3$, 0.5 mole of powdered MgO and 2.0 moles of powdered $SiO_2$ were added to prepare a base powder mixture for dielectric ceramics.

Comparative Example 2

Powders of $BaCO_3$, $SrCO_3$, $TiO_2$, $Ho_2O_3$, $Gd_2O_3$, $Cr_2O_3$, MgO and $SiO_2$ were compounded all at the same time in a molar ratio of 99.4:5.0:100:0.8:0.3:0.5:0.5:2.0. The mixture was calcined at 1,000° C. and was pulverized to prepare a base powder mixture for dielectric ceramics. The mixture had the same composition as that in EXAMPLE 2.

Example 3

$(Ba_{0.95}Ca_{0.05})(Ti_{0.95}Zr_{0.04}Hf_{0.01})O_3$ powder was used as $ABO_3$, $(Ba_{0.93}Ca_{0.05}Sm_{0.02})(Ti_{0.95}Zr_{0.04}Hf_{0.01})O_3$ powder was used as modified $ABO_3$, and $Ho_2O_3$—MgO—$MnO_2$—$B_2O_3$—$SiO_2$ powder was used as an additive. The $(Ba_{0.95}Ca_{0.05})(Ti_{0.95}Zr_{0.04}Hf_{0.01})O_3$ powder and the $(Ba_{0.93}Ca_{0.05}Sm_{0.02})(Ti_{0.95}Zr_{0.04}Hf_{0.01})O_3$ powder were prepared as in EXAMPLE 1.

The $(Ba_{0.95}Ca_{0.05})(Ti_{0.95}Zr_{0.04}Hf_{0.01})O_3$ powder and the $(Ba_{0.93}Ca_{0.05}Sm_{0.02})(Ti_{0.95}Zr_{0.04}Hf_{0.01})O_3$ powder were compounded in a molar ratio of 35:65. With respect to a total of 100 moles of this mixture, 0.5 mole of powdered $Ho_2O_3$, 1.0 mole of powdered MgO, 0.3 mole of powdered $MnO_2$, 0.5 mole of $B_2O_3$ and 1.0 mole of powdered $SiO_2$ were added to prepare a base powder mixture for dielectric ceramics.

Comparative Example 3

To 100 mol of powdered $(Ba_{0.937}Ca_{0.05})(Ti_{0.95}Zr_{0.04}Hf_{0.01})O_3$, which was preliminarily prepared as $ABO_3$, powders of 0.5 mole of $Ho_2O_3$, 0.65 mole of $Sm_2O_3$, and 1.0 mole of MgO were compounded. The mixture was calcined and was pulverized. To this mixture, powders of 0.3 mole of $MnO_2$, 0.5 mole of $B_2O_3$ and 1.0 mole of $SiO_2$ were compounded as components for an additive to prepare a base powder mixture for dielectric ceramics. The mixture had the same composition as that in EXAMPLE 3.

Example 4

$(Ba_{0.90}Ca_{0.10})TiO_3$ powder was used as $ABO_3$, $(Ba_{0.89}Ca_{0.10}Y_{0.01})TiO_3$ powder was used as modified $ABO_3$, and $Y_2O_3$—MgO—$SiO_2$—$B_2O_3$—CoO—$Fe_2O_3$ powder was used as an additive. The $(Ba_{0.90}Ca_{0.10})TiO_3$ powder and the $(Ba_{0.89}Ca_{0.01}Y_{0.01})TiO_3$ powder were prepared as in EXAMPLE 1.

The $(Ba_{0.90}Ca_{0.10})TiO_3$ powder and the $(Ba_{0.89}Ca_{0.01}Y_{0.01})TiO_3$ powder were compounded in a molar ratio of 80:20. With respect to a total of 100 moles of this mixture, 1.0 mole of powdered $Y_2O_3$, 0.5 mole of powdered MgO, 1.0 mole of powdered $SiO_2$, 0.1 mole of powdered $B_2O_3$, and 1.0 mole of powdered CoO, and 0.3 mole of powdered $Fe_2O_3$ were added to prepare a base powder mixture for dielectric ceramics.

Comparative Example 4

Powdered $(Ba_{0.898}Ca_{0.10})TiO_3$ was prepared as $ABO_3$. Powders of 1.1 moles of $Y_2O_3$, 0.5 mole of MgO and 1.0 mole of $SiO_2$ were compounded with respect to 100 moles of powdered $(Ba_{0.898}Ca_{0.10})TiO_3$. The mixture was calcined and was pulverized to prepare a calcined $Y_2O_3$—MgO—$SiO_2$ mixture. The calcined $Y_2O_3$—MgO—$SiO_2$ mixture, 100 moles of powdered $(Ba_{0.898}Ca_{0.10})TiO_3$, 0.1 mole of powdered $B_2O_3$, 1.0 mole of powdered CoO and 0.3 mole of powdered $Fe_2O_3$ were compounded to prepare a base powder mixture for dielectric ceramics. The mixture had the same composition as that in EXAMPLE 4.

Comparative Example 5

$BaTiO_3$ powder was used as $ABO_3$, $(Ba_{0.96}Dy_{0.04})TiO_3$ powder was used as modified $ABO_3$, and NiO—$MnO_2$—$SiO_2$ powder was used as an additive. The $BaTiO_3$ powder and the $(Ba_{0.96}Dy_{0.04})TiO_3$ powder were prepared as in EXAMPLE 1.

The $BaTiO_3$ powder and the $(Ba_{0.96}Dy_{0.04})TiO_3$ powder were compounded in a molar ratio of 50:50. With respect to a total of 100 moles of this mixture, 0.5 mole of powdered NiO, 0.2 mole of powdered $MnO_2$ and 1.5 moles of powdered $SiO_2$ were added to prepare a base powder mixture for dielectric ceramics.

2. Preparation of Monolithic Ceramic Capacitors

A polyvinyl butyral binder and an organic solvent such as ethanol were added to each of the base powders prepared in EXAMPLES 1 to 4 and COMPARATIVE EXAMPLES 1 to 5, and the mixture was wet-mixed in a ball mill to prepare ceramic slurries.

Each ceramic slurry was applied into a sheet by a doctor blade process to form a rectangular green ceramic sheet. The thickness of the green ceramic sheet was determined such that the thickness of the sintered dielectric ceramic layer became 2 μm.

A conductive paste was applied onto each green ceramic sheet by a screen-printing process to form a conductive paste layer for an inner electrode.

A plurality of green ceramic sheets including sheets provided with the conductive paste layers were stacked such that the conductive paste layers were alternately exposed at both side faces. A green composite was thereby prepared.

The green composite was heated to 350° C. in a nitrogen atmosphere to burn out the binder, and was fired at a temperature shown in Table 1 for 2 hours in a reducing $H_2$—$N_2$—$H_2O$ atmosphere with an oxygen partial pressure of $10^{-9}$ to $10^{31\ 12}$ MPa to form a sintered composite.

A conductive paste containing silver as the conductive component and a $B_2O_3$—$Li_2O$—$SiO_2$—$BaO$ glass frit was applied to two side faces of the sintered composite, and was baked at 600° C. in a nitrogen atmosphere to prepare external electrodes which are electrically connected to the internal electrodes.

The resulting monolithic ceramic capacitor had a width of 1.6 mm, a length of 3.2 mm and a thickness of 1.2 mm. The thickness of each dielectric ceramic layer between two internal electrodes was 2 μm. The number of effective dielectric ceramic layers was 100, and the opposing area of the electrode on each dielectric ceramic layer was 2.1 mm², in which the opposing area represented the area of the portion of the electrode opposing the adjacent electrode.

3. Measurement of Electrical Characteristics

Electrical characteristics of each of the resulting monolithic ceramic capacitors according to EXAMPLES 1 to 4 and COMPARATIVE EXAMPLES 1 to 5 were measured as follows.

The dielectric constant ∈ and the insulation resistance of each monolithic ceramic capacitor were measured at room temperature. Specifically, the dielectric constant ∈ was measured at 25° C., 1 kHz and 1 Vrms. For the measurement of the insulation resistance, a 20-V DC current was applied to the monolithic ceramic capacitor for 2 minutes at +25° C. in an electric field of 10 kV/mm to determine the product (CR product) of the electrostatic capacitance (C) and the insulation resistance (R).

Rates of the changes in electrostatic capacitance with temperature were determined as follows: A rate of change ($\Delta C/C_{20}$) between −25° C. and 85° C. on the basis of the electrostatic capacitance at 20° C. and a rate of change ($\Delta C/C_{25}$) between −55° C. and 125° C. on the basis of the electrostatic capacitance at 25° C. were determined.

A high-temperature loading test was performed for 36 samples. To each sample, a voltage of 30 volts was applied at 150° C. such that the electric field was 15 kV/mm and the change in insulating resistance over time was measured. The time when the insulation resistance of each sample decreased to 200 kΩ was defined as the lifetime. The average lifetime was calculated from those of 36 samples.

A change in electrostatic capacitance over time was measured after a DC voltage of 3.15 volts was applied for 60 hours at 125° C., 1 kHz and 1 Vrms, and a rate of the change in capacitance, in other words, the rate of change over time under DC load (hereinafter DC-load change rate) was calculated based on the electrostatic capacitance immediately after the DC voltage was applied at 125° C.

The dielectric constant ∈, the CR product, the temperature characteristic ($\Delta C/C_{20}$), the temperature characteristic ($\Delta C/C_{25}$), the high-temperature load lifetime, and the DC-load change rate are shown in Table 1.

TABLE 1

| | Firing Temp. (° C.) | Dielectric Constant ∈ | CR Product (ΩF) | Temperature Characteristics | | | | High-temp. Load Lifetime (Hour) | DC-Load Change Rate (%) |
|---|---|---|---|---|---|---|---|---|---|
| | | | | $\Delta C/C_{20}$ (%) | | $\Delta C/C_{25}$ (%) | | | |
| | | | | −25° C. | 85° C. | −55° C. | 125° C. | | |
| EX 1 | 1,200 | 3,150 | 8,810 | −6.1 | −5.7 | −6.0 | −11.5 | 180 | −1.7 |
| CE 1 | 1,200 | 3,300 | 8,770 | −8.0 | −12.1 | −12.3 | −19.3 | 240 | −14.1 |
| EX 2 | 1,180 | 2,910 | 9,510 | −7.3 | −6.7 | −8.7 | −13.0 | 150 | −1.4 |
| CE 2 | 1,180 | 3,220 | 5,000 | −9.1 | −19.2 | −13.1 | −22.6 | 270 | −2.1 |
| EX 3 | 1,200 | 2,760 | 10,240 | −7.2 | −8.0 | −9.5 | −13.5 | 250 | −1.2 |
| CE 3 | 1,200 | 2,820 | 7,990 | −6.8 | −9.6 | −9.0 | −13.1 | 23 | −4.5 |
| EX 4 | 1,200 | 2,660 | 9,570 | −6.9 | −5.7 | −8.4 | −11.9 | 130 | −1.9 |
| CE 4 | 1,200 | 2,540 | 8,380 | −5.4 | −6.6 | −5.6 | −10.5 | 8 | −5.1 |
| CE 5 | 1,200 | 3,150 | 7,730 | −6.8 | −4.5 | −6.2 | −12.1 | 170 | −13.1 |

EX: EXAMPLE, CE: COMPARATIVE EXAMPLE

4. Measurement of Concentration Distribution of Rare Earth Element

Each of the monolithic ceramic capacitors according to EXAMPLES 1 to 4 and COMPARATIVE EXAMPLES 1 to 5 was polished to form a thin specimen for transmission electron microscopy in order to measure the concentration distribution of the rare earth element in the monolithic ceramic as follows.

The analysis points in the grain boundaries were determined as follows: The periphery defined by two or three crystal grains observed in an arbitrary visual field was divided into quarters and the four aliquot points were analyzed. At least 20 analysis points were selected between different crystal grains to reduce the contribution of the above four analysis points to the analytical results. The concentrations of the rare earth element were measured at these analysis points by probing with a 2-nm electron beam of a transmission electron microscope equipped with an energy dispersive X-ray (EDX) spectrometer. The average concentration of the rare earth element at the grain boundaries was calculated from these concentrations.

The analysis points of the crystal grains were determined as follow: At least 10 crystal grains were selected at random, and at least 9 points including the center and arbitrary points within a distance corresponding to about 5% the diameter from the surface of each of the selected crystal grains were selected.

Figure 2:
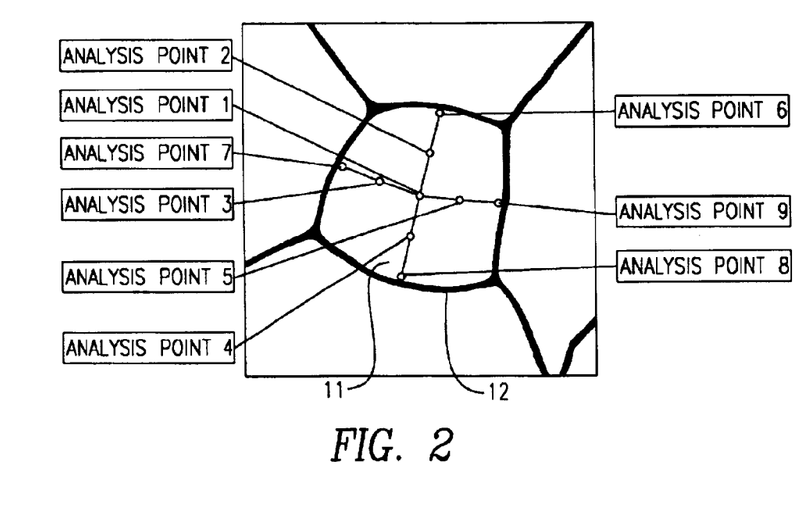
FIG. 2 is a schematic view illustrating analysis points for determining the concentration profile of a rare earth element in a crystal grain.

FIG. 2 shows an example of analysis points in a crystal grain 11. The analysis points include ANALYSIS POINT 1 in the center, ANALYSIS POINTS 6 to 9 within a distance corresponding to about 5% the diameter from the surface of the grain, and ANALYSIS POINTS 2 to 5 at other positions.

The concentrations of the rare earth element at ANALYSIS POINTS 1 to 9 were determined to calculate the average concentration of the rare earth element in the interior of the crystal grain.

The ratio of the average rare earth element concentration in the interiors of the crystal grains to the average rare earth element concentration in the grain boundaries (represented by reference numeral 12 in FIG. 2) was calculated (hereinafter the ratio is referred to as the "crystal-grain-to-grain-boundary ratio").

Also the proportion of the crystal grains having a rare earth element distribution in which the rare earth element concentration at ANALYSIS POINT 1 in the center of the crystal grain is about 1/50 or more the maximum rare earth element concentration at ANALYSIS POINTS 6 to 9 within a distance corresponding to 5% the diameter from the surface of the crystal grain (hereinafter such a grain is referred to as a "crystal grain having a core containing a dissolved rare earth element") to the total crystal grains was calculated.

Table 2 shows the ratio of the crystal grain to the grain boundary and the proportion of the crystal grains having the cores containing the dissolved rare earth element.

TABLE 2

|  | Proportion of Crystal Grains having Cores Containing Dissolved Rare Earth Element (%) | Crystal-Grain-to-Grain-Boundary Ratio (%) | Evaluation |
| --- | --- | --- | --- |
| EX 1 | 55 | 22 | Good |
| CE 1 | 86 | 81 | Not good |
| EX 2 | 32 | 32 | Good |
| CE 2 | 91 | 45 | Not good |
| EX 3 | 69 | 42 | Good |
| CE 3 | 9 | 25 | Not good |
| EX 4 | 25 | 12 | Good |
| CE 4 | 6 | 14 | Not good |
| CE 5 | 53 | 78 | Not good |

EX: EXAMPLE, CE: COMPARATIVE EXAMPLE

Figure 3:
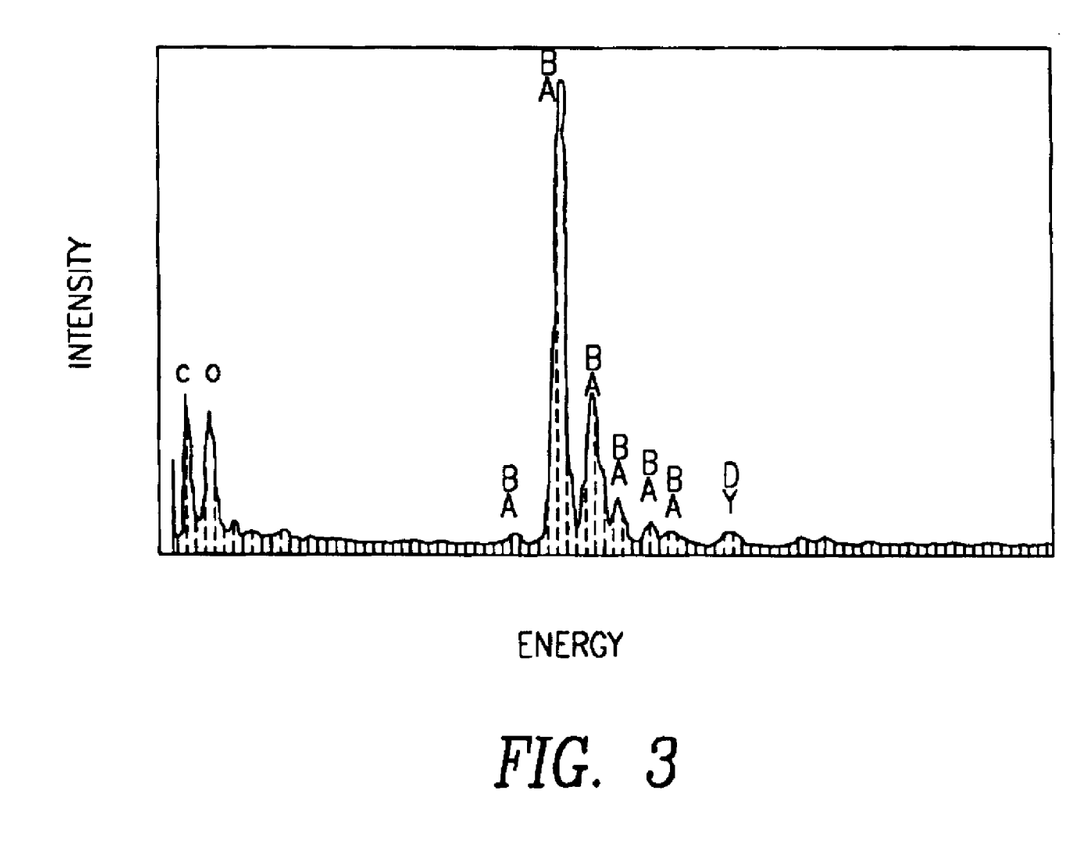
FIG. 3 is an EDX spectrum at ANALYSIS POINT 1 in FIG. 2 of the crystal grain containing the rare earth element that is dissolved up to the interior.

FIG. 3 is an EDX spectrum at ANALYSIS POINT 1 in FIG. 2 of a crystal grain containing the rare earth element that is dissolved up to the interior.

5. Comprehensive Evaluation

EXAMPLE 1 will now be compared with COMPARATIVE EXAMPLE 1.

As shown in Table 2, in EXAMPLE 1, the proportion of the crystal grains having cores that contain the dissolved rare earth element is 55% and the crystal-grain-to-grain-boundary ratio of the rare earth element in the grains is 22%. In COMPARATIVE EXAMPLE 1, the proportion of the crystal grains having cores that contain the dissolved rare earth element is 86% and the crystal-grain-to-grain-boundary ratio of the rare earth element in the grains is 81%.

The dielectric constant, the CR product, and the high-temperature load lifetime are substantially the same in EXAMPLE 1 and COMPARATIVE EXAMPLE 1, as shown in Table 1: The dielectric constants are about 3,200, the CR products are about 8,800 ΩF and the high-temperature load lifetimes are about 200 hours.

EXAMPLE 1 complies with the X7R characteristics in the EIA Standard whereas COMPARATIVE EXAMPLE 1 does not comply with these characteristics. The DC-load change rate of EXAMPLE 1 is −1.7% which is superior to −14.1% of COMPARATIVE EXAMPLE 1.

In EXAMPLES 2 to 4, as shown in Table 2, the proportion of the crystal grains having cores that contain the dissolved rare earth element is in the range of about 20% to 70%, and the crystal-grain-to-grain-boundary ratio of the rare earth element is less than about 50%.

Furthermore, as shown in Table 2, EXAMPLES 2 to 4 comply with the X7R characteristics in the EIA Standard and exhibits prolonged high-temperature load lifetimes indicating high reliability and small DC-load change rates.

In COMPARATIVE EXAMPLE 2, as shown in Table 2, the proportion of the crystal grains having cores that contain the dissolved rare earth element is 91%, and the crystal-grain-to-grain-boundary ratio of the rare earth element is 45%. COMPARATIVE EXAMPLE 2 does not comply with the X7R characteristics in the EIA Standard as shown in Table 1 because of such a high proportion of the crystal grains having cores that contain the dissolved rare earth element.

In COMPARATIVE EXAMPLE 3, as shown in Table 2, the proportion of the crystal grains having cores that contain the dissolved rare earth element is 9%, and the crystal-grain-to-grain-boundary ratio of the rare earth element is 25%. COMPARATIVE EXAMPLE 3 exhibits a short high-temperature load lifetime of 23 hours indicating insufficient reliability as shown in Table 1 because of such a low proportion of the crystal grains having cores that contain the dissolved rare earth element.

In COMPARATIVE EXAMPLE 4, as shown in Table 2, the proportion of the crystal grains having cores that contain the dissolved rare earth element is 6%, and the crystal-grain-to-grain-boundary ratio of the rare earth element is 14%. COMPARATIVE EXAMPLE 4 exhibits a short high-temperature load lifetime of 8 hours indicating insufficient reliability as shown in Table 1 because of such a low proportion of the crystal grains having cores that contain the dissolved rare earth element.

In COMPARATIVE EXAMPLE 5, as shown in Table 2, the proportion of the crystal grains having cores that contain the dissolved rare earth element is 53%, and the crystal-grain-to-grain-boundary ratio of the rare earth element is 78%. COMPARATIVE EXAMPLE 5 exhibits a large DC load change rate over time of −13.1% as shown in Table 1 because of such a high crystal-grain-to-grain-boundary ratio of the rare earth element.

Various changes and modifications can be made in the process and products of this invention without departing from the spirit and scope thereof. The various embodiments disclosed herein were for the purpose of illustration only and were not intended to limit the invention.

What is claimed is:

1. A method for making a dielectric ceramic having a ceramic structure comprising crystal grains and grain boundaries between the crystal grains, the crystal grains comprising a main component represented by the formula $ABO_3$ in which the average rare earth element concentration in the interior of the crystal grains is about 50% or less of the average rare earth element concentration at the grain boundaries, and about 20% to 70% of the crystal grains, by number, have a rare earth element concentration in the center of the crystal grain of at least about 1/50 of the maximum rare earth element concentration in a region extending inward from the surface by a distance corresponding to about 5% of the diameter of the crystal grain, comprising:

mixing AO, $BO_2$, and at least one rare earth element, calcining the mixture in air, and pulverizing the mixture to prepare a modified $ABO_3$ powder in which the rare earth element is present in the interiors of the particles;

mixing AO and $BO_2$, calcining the mixture in air, and pulverizing the mixture to prepare an $ABO_3$ powder in which the rare earth element is not present in the interiors of the particles; and mixing the modified $ABO_3$ powder, the $ABO_3$ powder, and additional rare earth element and firing the mixture, wherein A is barium or barium and at least one of calcium and strontium, and B is titanium or titanium and at least one of zirconium and hafnium.

2. A method according to claim 1 wherein A comprises barium and B comprises titanium.

3. A method according to claim 2, wherein the overall rare earth element concentration to 100 moles of the main component $ABO_3$ is about 0.2 mol or more.

4. A method according to claim 3, wherein the overall rare earth element concentration to 100 moles of the main component $ABO_3$ is about 5 mols or more.

5. A method according to claim 4, further comprising combining at least one of MgO, $SiO_2$, $MnO_2$ and B2O3 with one of the powders.

6. A method according to claim 5, wherein the rare earth element is at least one element selected from the group consisting of Y, Dy, Ho, Gd, Hf and Sm.

7. A method according to claim 6, wherein at least two rare earth elements are employed.

8. A method according to claim 7, wherein the two rare earth elements are Ho and Gd.

9. A method according to claim 7, wherein the two rare earth elements are Hf and Sm.

10. A method according to claim 1, wherein the rare earth element is at least one element selected from the group consisting of Y, Dy, Ho, Gd, Hf and Sm.

11. A method according to claim 10, wherein at least two rare earth elements are employed.

12. A method according to claim 11, wherein the two rare earth elements are Ho and Gd.

13. A method according to claim 11, wherein the two rare earth elements are Hf and Sm.

14. A method for evaluating a dielectric ceramic that has a ceramic structure comprising crystal grains and grain boundaries between the crystal grains, the crystal grains comprising a main component represented by the formula $ABO_3$ and an additive containing a rare earth element, wherein A is barium or barium and at least one of calcium and strontium, and B is titanium or titanium and at least one of zirconium and hafnium, the method comprising:

measuring the average rare earth element concentration in the interiors of the crystal grains and the average rare earth element concentration at the grain boundaries;

determining whether or not a first condition that the average rare earth element concentration in the interior of the crystal grains is about 50% or less of the average rare earth element concentration at the grain boundaries is satisfied;

measuring the rare earth element concentration in the center of each crystal grain and the maximum rare earth element concentration in a region extending inward from the surface by a distance corresponding to about 5% of the diameter of the crystal grain; and determining whether or not a second condition that about 20% to 70% of the crystal grains, by number, have a rare earth element concentration in the center of the crystal grain which is at least $\frac{1}{50}$ of the maximum rare earth element concentration in the region is satisfied;

wherein the dielectric ceramic to considered to be non-defective when the dielectric ceramic satisfies the first and second conditions.

* * * * *